Figures 1, 2:
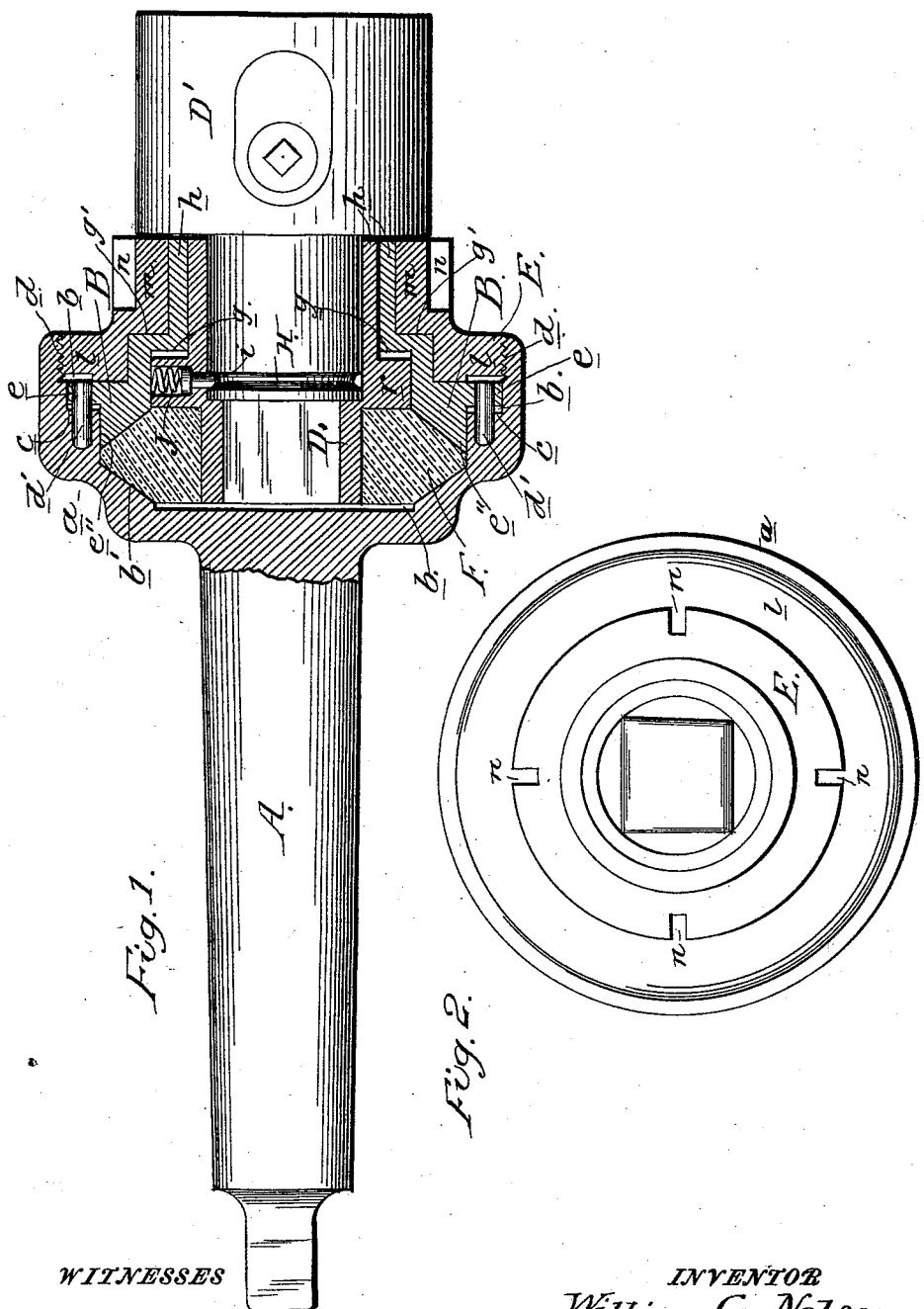

(No Model.)

W. G. NELSON.
CHUCK.

No. 500,292. Patented June 27, 1893.

WITNESSES
Thomas W. Fowler
Chas. Rhodes.

INVENTOR
William G. Nelson,
by T. Walter Fowler,
Attorney

UNITED STATES PATENT OFFICE.

WILLIAM G. NELSON, OF BROOKLYN, NEW YORK, ASSIGNOR OF ONE-HALF TO ALFRED A. FISHER, OF SAME PLACE.

CHUCK.

SPECIFICATION forming part of Letters Patent No. 500,292, dated June 27, 1893.

Application filed February 27, 1893. Serial No. 463,941. (No model.)

*To all whom it may concern:*

Be it known that I, WILLIAM G. NELSON, a citizen of the United States, residing at Brooklyn, in the county of Kings and State of New York, have invented certain new and useful Improvements in Chucks; and I do hereby declare the following to be a full, clear, and exact description of the invention, such as will enable others skilled in the art to which it appertains to make and use the same.

My invention relates to chucks, and has special reference to drill chucks and others of the class used in machines for boring, tapping and similar purposes, and my invention consists of the constructions and combinations of devices which I shall hereinafter fully describe and claim.

Figure 1, represents a longitudinal sectional view of a chuck embodying my invention. Fig. 2, is an end view of the same.

In machines of the character mentioned, the chuck is usually rigidly fitted to the drive-spindle, and, consequently, when employed for tapping, it becomes necessary as the tap approaches the bottom of the machine to prevent it from striking said bottom and receiving the full power transmitted through the spindle, which would result in the breaking of the tap or the derangement of the driving mechanism. Even the exercise of the greatest care does not avoid these difficulties, and, therefore, it has been found expedient to provide a chuck in which the tool-holder is held by friction to the inner end of the spindle and is adapted to yield under a predetermined force to remove the strain from the chuck and its actuating mechanism. Another great draw-back to the form of chuck now in use, is the tendency of the meeting surfaces of the two-part chuck to wear unevenly, thereby throwing the point of the tool out of center to the great detriment of the work and the liability of breaking the tool.

The object of my invention is to overcome these difficulties and especially to provide a two-part chuck whose meeting surfaces form beveled seats, which always insures the perfect centering of the tool; and in providing an adjustable follower for equalizing the pressure on the friction piece.

Referring now to said drawings for a more complete explanation of my invention, A represents a drill spindle or driver to which the chuck is to be attached.

The inner end of the spindle is provided with an enlarged head $a$ suitably recessed at $b$ to receive the inner end of the chuck, and provided at the base of the recess with an inwardly inclined seat $b'$ as shown, the said head $a$ having an internal shoulder $c$ and annular threaded flange $d$, and having projecting from the face of the shoulder suitable pins $d'$ adapted to engage corresponding holes in a follower or thrust nut B. This follower has an annular flange $e$ in which the holes are formed, adapted to be seated against the shoulder $c$, and it has an inner flange $e''$ adapted to enter the recessed head of the part $a$ and is provided with an inclined or beveled seat oppositely arranged with relation to the inclined seat in the head $a$ as shown. This follower or thrust collar is also provided with inner and outer shoulders $g$ $g'$ and an outwardly extending sleeve portion $h$, the said sleeve portion being confined between the socket holder D and a nut E. The nut E has a vertical flange portion $l$, externally threaded and adapted to engage the threads on the interior of the head $a$, and it has a cylindrical portion or sleeve $m$ fitted over the sleeve of the follower or thrust collar and provided with recesses $n$, which may be engaged by a spanner or other tool for operating it whereby the follower or thrust collar is forced tightly against the friction piece F.

The socket piece or holder D is made of the usual form and it has a head D' into which the shank of the tool is adapted to be fitted. The socket is preferably made square at its inner end and is provided with a collar $r$.

A hard rubber paper or fibrous friction piece F is securely fitted upon the inner end of the socket piece and is made of disk form having its opposite faces flat and parallel for a portion of its width and its remaining surface tapered on both sides to impart to the edge of the friction piece a V-shape in cross section, as fully described and claimed in an application filed by me August 12, 1892, Serial No. 442,924. When the parts of the chuck are in proper position one of the flat faces of the friction piece will find a seat against a corresponding surface at the base of the recess in the head $a$ and the beveled surface on that side will be seated against the beveled or inclined seat of said head. The opposite straight face of the friction piece will be engaged by the face of the collar $r$ and the inclined surface on that side of the friction piece will be engaged by the inclined seat on the inner end of the follower or thrust collar, whereby when the nut E is turned it forces the follower tightly against the friction piece and equalizes the pressure and adjustment on all sides; the pins projecting from the head $a$ and entering the holes in the collar $e$ of the follower preventing the latter from partaking of the rotary movement of the nut E, but allowing it to be guided squarely to its seat against the friction piece. By this construction the several parts of the chuck are united and move together until the strain or resistance upon the tool overcomes the frictional contact between the friction piece and the parts which engage it, and allows the spindle to slip thereby relieving it of undue strain. Any wear between the contacting surfaces may be readily taken up by the simple adjustment of the nut E, and the point of the tool is always maintained central as disclosed in said former application.

The shank of the tool holder is provided with an annular groove H and the collar $r$ of the socket piece is provided with a recess in which is seated a pin $i$ adapted to engage said groove and having a spring J bearing upon it as shown.

Having thus described my invention, what I claim as new, and desire to secure by Letters Patent, is—

1. A two-part chuck having a friction piece with beveled edges between its adjoining faces, the driving portion having a recessed head, a follower located within the head having an inner face beveled to fit the corresponding face of the friction piece, and a nut slidable upon the follower and adapted to enter the recessed head and bear upon the follower with equal pressure on all sides.

2. In a chuck, the driver with its recessed head having a shoulder $c$ and internally threaded entrance, a socket piece for the tool-holder having a friction piece by which motion is transmitted from the driver to the driven portion, a follower adapted to enter the head of the driver and bear against the friction piece, and a nut engaging the threaded entrance of the recessed head of the driver and adjusting the follower, whereby the latter bears with equal force on all sides of the friction piece substantially as herein described.

3. In a chuck, the driver with its recessed head having internal shoulder and internally threaded entrance, a socket piece for the tool-holder having a collar $r$ and friction piece by which the motion of the driver is communicated to the socket piece, a follower adapted to enter the recessed head and bear against the friction piece, having a flange $e$ shoulders $g$ and $g'$ and sleeve $h$ slidably mounted upon the socket piece, and a nut mounted upon the follower to bear against its shoulder $g'$ and provided with an externally threaded flange adapted to engage the internally threaded entrance to the recessed head of the driver, whereby when the nut is turned the follower is adjusted with equal force against all sides of the friction piece, substantially as herein described.

4. In a chuck, a driver having a recessed head, a driven portion having a socket piece provided with a friction piece and annular collar having a recess, a spring-actuated pin in said recess, a follower or thrust nut inclosing said collar, and a nut threaded in the recessed head of the driver and bearing against the follower.

In testimony whereof I affix my signature in presence of two witnesses.

WILLIAM G. NELSON.

Witnesses:
E. GORDON HOPPER,
A. A. FISHER.